June 18, 1929.　　　A. W. DAINOS　　　1,718,117
FOUNTAIN BRUSH
Filed April 23, 1928
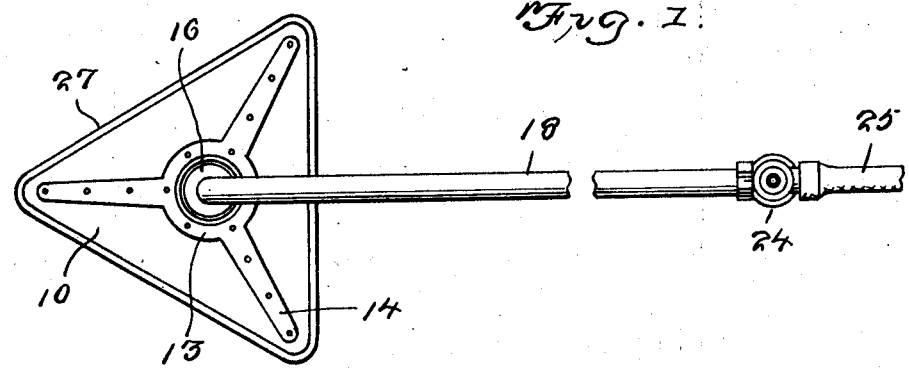
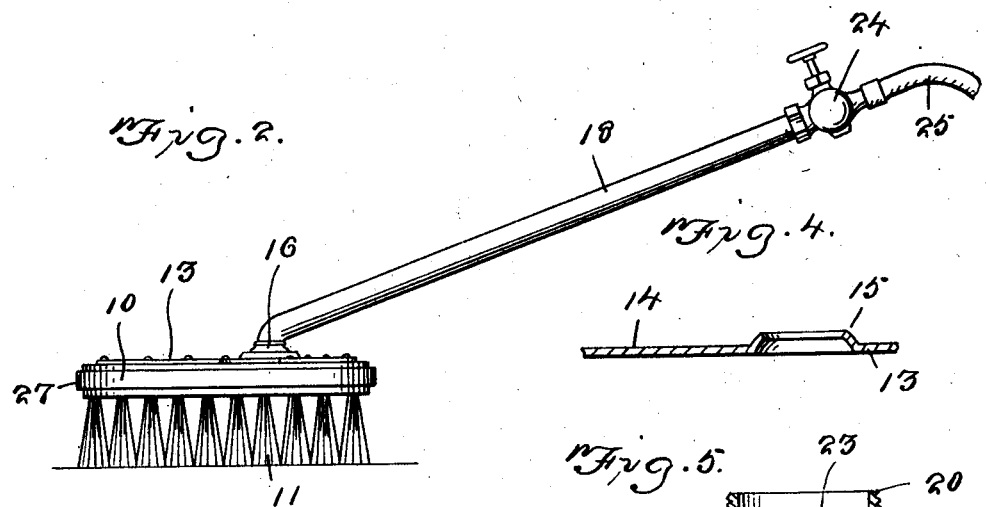
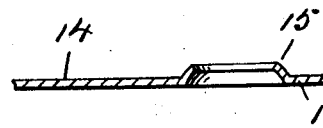
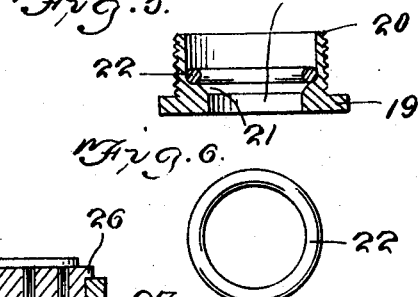
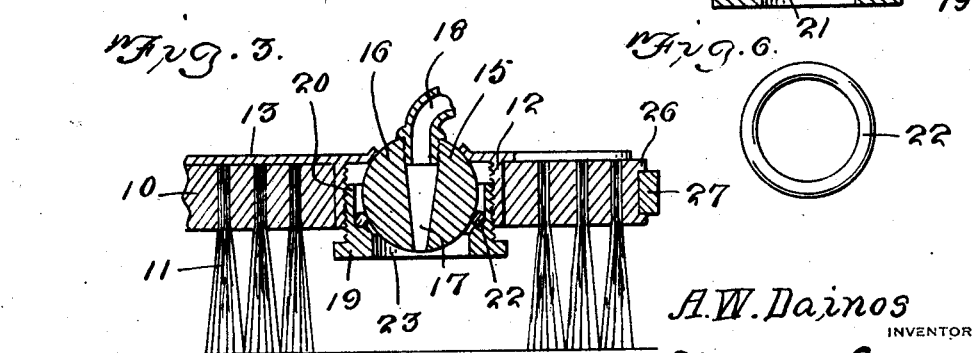
A. W. Dainos
INVENTOR
BY Victor J. Evans
ATTORNEY

Patented June 18, 1929.  1,718,117

UNITED STATES PATENT OFFICE.

ANTHONY W. DAINOS, OF NEW ORLEANS, LOUISIANA.

FOUNTAIN BRUSH.

Application filed April 23, 1928. Serial No. 272,310.

This invention has particular relation to fountain brushes of the fluid pressure type.

An object of the invention comprehends a brush head having a universal connection with the handle therefor.

Another object of the invention contemplates an adjusting element for the universal connection.

More specifically stated the brush head is provided with a circumferential band adapted to prevent injury to surfaces being washed or painted by the brush head.

With the above and other objects in view, the invention further consists of the following novel features and details of construction, to be hereinafter more fully described, illustrated in the accompanying drawing and pointed out in the appended claims.

In the drawing:—

Figure 1 is a top plan view of the invention.

Figure 2 is a side elevation thereof.

Figure 3 is a longitudinal sectional view taken through the brush head and illustrating the connection of the universal joint therewith.

Figure 4 is a sectional view taken through a cover plate for the brush having a recess portion adapted to prevent displacement of the universal joint.

Figure 5 is a horizontal sectional view taken through the locking element for the universal joint.

Figure 6 is a top plan view of a packing for the locking element.

Referring to the drawing in detail, wherein like characters of reference denote corresponding parts, the reference character 10 indicates a brush head having bristles 11 carried upon the under surface thereof.

Said bristles are spaced from an interiorly threaded sleeve member 12 positioned within an opening in the brush head. A plate member 13, carried upon the upper side of the brush head 10, is provided with radially disposed arms 14 also having connection with the head and adapted to prevent displacement of the plate. Said plate is provided with a depressed and apertured portion 15 adapted to accommodate the upper portion of a ball 16, the latter having a bore 17 adapted for connection at its uppermost end with the adjacent end of a tubular member or handle 18.

A locking element, in the nature of a nut 19, provided with an upstanding exteriorly threaded sleeve portion 20, is adapted for threaded engagement with the inner side walls of the sleeve member 12. A beveled seat 21, of annular formation, is faced with a resilient packing ring, preferably composed of rubber, and such as indicated at 22, to frictionally engage the lower portion of the ball 16 to rigidly hold the brush head at a desired position upon the end of the handle member 18. The nut 19 is furthermore provided with an opening 23, disposed centrally thereof and which is adapted to accommodate the lowermost depending portion of the ball 16.

The outermost end of the handle member 18 is provided with a valve member 24 adapted for connection with a hose or other conduit, such as indicated at 25.

Water under pressure may be introduced from the hose or conduit 25 to the handle member 18 through the bore 17 and the ball 16 to the surface to be washed and subsequently upon the bristles 11. It is to be noted that the invention may be equally and effectually as well applied for use in whitewashing and other cold water painting.

The invention is primarily designed for use in the washing of automobiles and other vehicle bodies. As illustrated in Figure 1 of the drawing the brush head is shown as being of pyramidal shape, whereby any one of the points or corners thereof may be locked in a desired position to wash or paint within crevices or otherwise inaccessible places.

The valve 24 being adapted to regulate the flow and velocity of the fluid under pressure.

It is obviously understood that the water or paint may also be gravity fed.

As illustrated in Figure 3 of the drawing, a circumferential groove 26 in the outer side edge of the brush head 10 is adapted to accommodate a bumper or band 27 to prevent injury to surfaces of vehicle bodies and the like while in use.

The invention is susceptible of various changes in its form, proportions and minor details of construction, and the right is herein reserved to make such changes as properly fall within the scope of the appended claims.

Having thus described the invention, what is claimed is:—

1. A fountain brush comprising a brush head having a tubular handle, a ball carried upon the adjacent end of the tubular handle being adapted for reception within an opening in the head, a plate carried upon the upper side of the head having a depressed and apertured portion adapted to prevent displacement of the ball, a locking element carried within the opening in the head and adapted for contacting engagement with the ball, a packing carried by the locking element adapted for frictional engagement with said ball and means carried by the ball to introduce fluids from the handle to the brush head.

2. A fountain brush comprising a brush head having a handle, a ball carried upon the adjacent end of the handle being adapted for reception within an opening in the head, a plate carried upon the upper side of the head having a depressed and apertured portion adapted to prevent displacement of the ball, an apertured locking element carried within the opening in the head and adapted for contacting engagement with the ball, a packing carried by the locking element adapted for frictional engagement with said ball, and the handle and ball having registering bores to facilitate application of fluids under pressure to the bristles of the brush head.

In testimony whereof I affix my signature.

ANTHONY W. DAINOS.